(12) United States Patent
Fouquet

(10) Patent No.: US 7,249,557 B2
(45) Date of Patent: Jul. 31, 2007

(54) ELECTRIC COFFEE MAKER AND METHOD OF MAKING COFFEE USING SUCH A COFFEE MAKER

(75) Inventor: Nicolas Fouquet, Lyons (FR)

(73) Assignee: Santos SA, Vaulx-en-velin (FR)

( * ) Notice: Subject to any disclaimer, the term of this patent is extended or adjusted under 35 U.S.C. 154(b) by 413 days.

(21) Appl. No.: 10/856,937

(22) Filed: Jun. 1, 2004

(65) Prior Publication Data

US 2004/0237795 A1    Dec. 2, 2004

(30) Foreign Application Priority Data

Jun. 2, 2003    (FR) .................................. 03 06628

(51) Int. Cl.
*A47J 31/42* (2006.01)

(52) U.S. Cl. .................. 99/300; 99/307; 99/302 R; 99/305

(58) Field of Classification Search .................. 99/300, 99/304, 306, 307, 305, 302 R; 426/433, 426/435
See application file for complete search history.

(56) References Cited

U.S. PATENT DOCUMENTS

| | | | | | |
|---|---|---|---|---|---|
| 3,530,787 | A | * | 9/1970 | Litterio | .................. 99/281 |
| 4,360,128 | A | * | 11/1982 | Neumann | .................. 222/26 |
| 4,655,123 | A | | 4/1987 | Schrader | |
| 5,123,335 | A | | 6/1992 | Aselu | |
| 5,833,096 | A | | 11/1998 | Ohu | |
| 6,065,939 | A | | 5/2000 | Lin | |
| 6,067,894 | A | * | 5/2000 | Eugster | .................. 99/285 |

FOREIGN PATENT DOCUMENTS

| | | |
|---|---|---|
| EP | 1055386 | 11/2000 |
| FR | 2653649 | 10/1989 |
| GB | 786401 | 2/1956 |

* cited by examiner

*Primary Examiner*—Reginald L. Alexander
(74) *Attorney, Agent, or Firm*—Dowell & Dowell P.C.

(57) ABSTRACT

An electric coffee maker for preparing a coffee drink from ground coffee and water, a reservoir adapted to store water for preparing coffee, and a protective housing which encloses a device for preparing the coffee drink. The reservoir defines a free volume in which water for preparing coffee may be stored and is also of a size and configured so as to accommodate a bottle in which water for preparing the coffee is stored. A temporary connection device is provided to conduct water from the reservoir or bottle to the device preparing the coffee drink.

9 Claims, 3 Drawing Sheets

ELECTRIC COFFEE MAKER AND METHOD OF MAKING COFFEE USING SUCH A COFFEE MAKER

BACKGROUND OF THE INVENTION

1. Field of the Invention

The present invention relates to an electric coffee maker of the type comprising a reservoir for storing water for preparing the coffee. It also relates to a method for making coffee with the aid of such a coffee-maker.

2. Brief Description of the Related Art

Electric coffee maker is understood to mean not only a coffee maker employing filters but also a coffee machine particularly for preparing expresso coffees.

One of the known methods for preparing a coffee drink consists in heating water, then in causing this water to pass through ground coffee.

In a conventional electric coffee maker, the water is taken from a reservoir which must be regularly refilled. To fill this reservoir with water using a jug or a full, shop-bought bottle is a tedious operation, during which there is always a risk of spilling water outside the reservoir.

U.S. Pat. No. 5,123,335 describes a coffee machine which comprises a removable water reservoir. This reservoir is such that, when it has been emptied, the only possible way of refilling the coffee machine with water is to fill said reservoir with water.

At least one purpose of the present invention is to be able to facilitate refill with water of an electric coffee maker of the afore-mentioned type.

SUMMARY OF THE INVENTION

To that end, the invention relates to an electric coffee maker, comprising a device for preparing a coffee drink from ground coffee and water, a reservoir adapted to store water for preparing the coffee, as well as a protective housing which encloses the device at least partially, characterized in that, inside the protective housing, said reservoir defines a free volume configured so as to be able to accommodate a bottle storing water for preparing the coffee drink, an opening provided in the protective housing giving access to said free volume, the electric coffee maker comprising a device for temporarily connecting the coffee preparing device to the inner volume of the water storage bottle.

Other advantageous characteristics of this electric coffee maker are defined in accompanying claims 2 to 10.

The invention also has for its object a method for preparing a coffee drink, characterized in that a coffee maker as defined hereinabove is used and in that it comprises steps in which:

a) the temporary connection device conducts the water from a storage bottle arranged in said free volume, to the device for preparing a coffee drink, then b) the coffee-preparing device prepares the coffee drink with the water conducted in step a).

BRIEF DESCRIPTION OF THE DRAWINGS

The invention will be more readily understood on reading the following description given solely by way of example and made with reference to the accompanying drawings, in which.

DESCRIPTION OF PREFERRED EMBODIMENT

Figure 2:
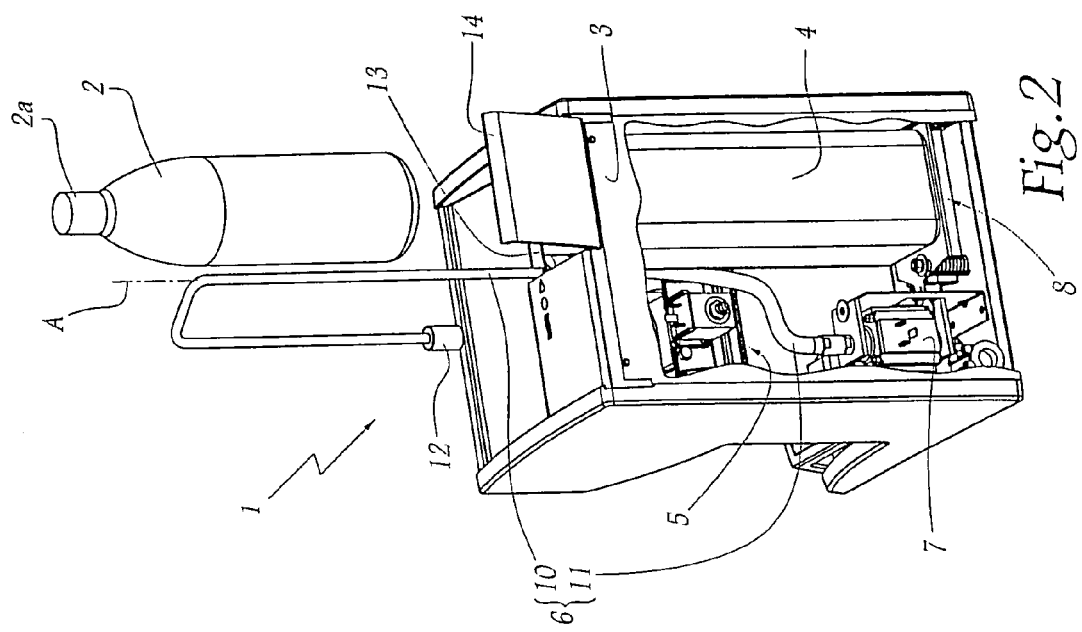
FIG. 2 is an exploded view in perspective, with parts torn away, and shows the same assembly as FIG. 1 seen from another angle.

Referring now to the drawings, FIGS. 1 to 5 illustrate an electric coffee maker 1 which is configured so as to be able to enclose a bottle 2 for storing water and to prepare a coffee drink with water coming from this bottle 2. The latter, which is a commercially available replaceable bottle, is visible only in FIGS. 1 to 3.

The electric coffee maker 1 comprises a protective housing 3 which encloses a reservoir 4 and a part of a device 5, known per se, for preparing a coffee drink from ground coffee and water. A suction conduit 6 of which one end is connected to a pump 7, is provided to draw water and to conduct it to the device 5, of which this pump 7 forms part.

The reservoir 4 is removable and rests on scales 8 disposed inside the protective housing 3 and which serve to determine, by weighing, the quantity of water still available for preparing coffee, in order that a visual indicator can light up when this available quantity of water passes below a predetermined threshold.

The reservoir 4 is open at the top and defines a free volume 9 configured so as to be able to temporarily accommodate at least one bottle 2 for storing 1.5 litres of water, of the type currently available on the market, full of mineral water. To that end, this free volume 9 is elongated along a substantially vertical axis X-X'. It presents dimensions such that its contour extends outside the imaginary cylinder of revolution C shown in FIG. 6. This cylinder of revolution C has a length $L_1$ of 170 mm and a diameter D of 70 mm.

Figure 6:
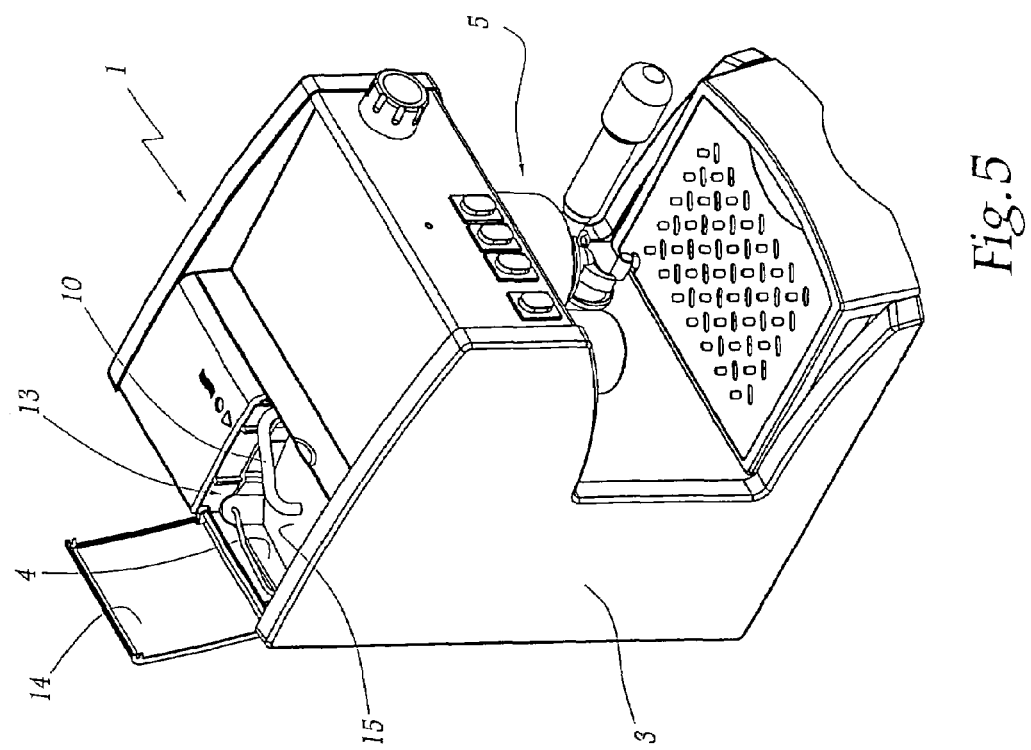
FIG. 6 is a view in perspective of geometrical figures with the aid of which a free volume provided for the water storage bottle is defined inside the electric coffee maker of FIGS. 1 to 5.

The free volume 9 is preferably contained in the imaginary rectangular parallelepiped P shown in FIG. 6. This rectangular parallelepiped P is elongated and has a length $L_2$ equal to 350 mm. Its transverse section is a square of which each side has a measurement $l_3$ equal to 120 mm. If the free volume 9 presents the same dimensions as the rectangular parallelepiped P, a bottle storing two litres of water, of the type currently sold full of mineral water, may easily be housed therein.

The suction conduit 6 comprises a rigid tube 10 bent so as to make a half-turn, as well as a deformable tube 11 which connects the rigid tube 10 to the pump 7. The rigid tube 10, of which the free end is provided with a strainer 12, is mounted so as to be able to slide along a substantially vertical axis A and to pivot about this axis A so that the strainer 12 can be introduced in the reservoir 4 or be placed outside this reservoir 4.

Figure 4:
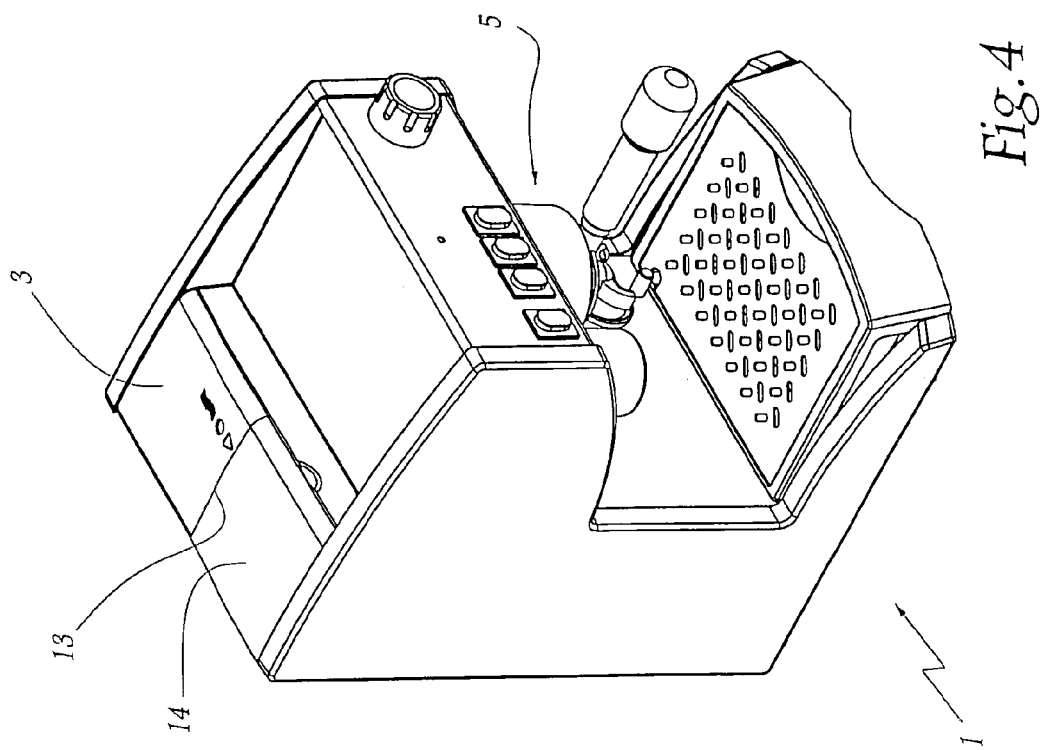
FIG. 4 is a view similar to FIG. 3 and illustrates the state of the electric coffee maker of FIGS. 1 to 3 after the storage bottle has been installed therein.

An opening 13 for the passage of the reservoir 4 and the water bottle 2 is provided in the protective housing 3. It is located in line with and above the free volume 9. A pivotally mounted flap 14 may obturate this opening 13, as illustrated in FIG. 4.

Figure 5:
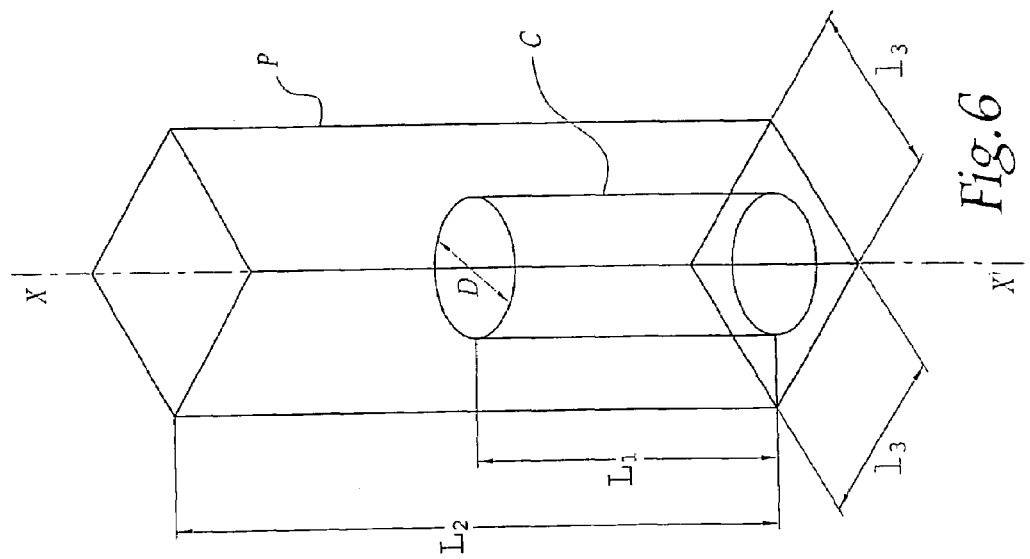
FIG. 5 is a view similar to FIGS. 3 and 4 and illustrates another possible manner of using the electric coffee maker of FIGS. 1 to 4.

The water with which the device 5 prepares coffee can be stored in the coffee maker 1 in two ways. One of these is illustrated in FIG. 3, while the other way of storing the water is illustrated in FIG. 5.

Figure 3:
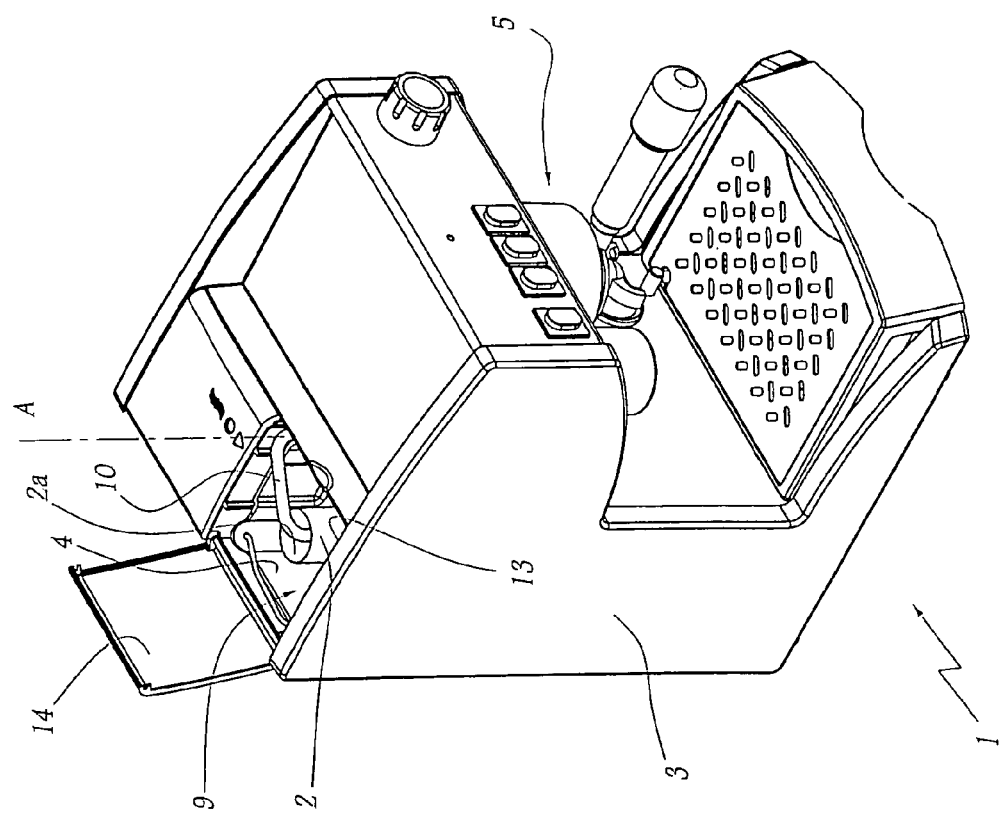
FIG. 3 is a view in perspective of the assembly shown in FIGS. 1 and 2 while the bottle is in place in the coffee maker.

In FIG. 3, a bottle 2, whose stopper has been removed and which contains mineral water bought in this bottle 2, is located in the reservoir 4, where it occupies the greater part of the volume 9. Its neck 2a, which is directed upwardly, is not obturated hermetically, so that atmospheric air can be admitted into the bottle via this neck 2a as the water is consumed. The suction conduit 6 penetrates, via neck 2a, into the bottle 2, where its end provided with the strainer 12 may draw water in order then to conduct it to pump 7.

Figure 1:
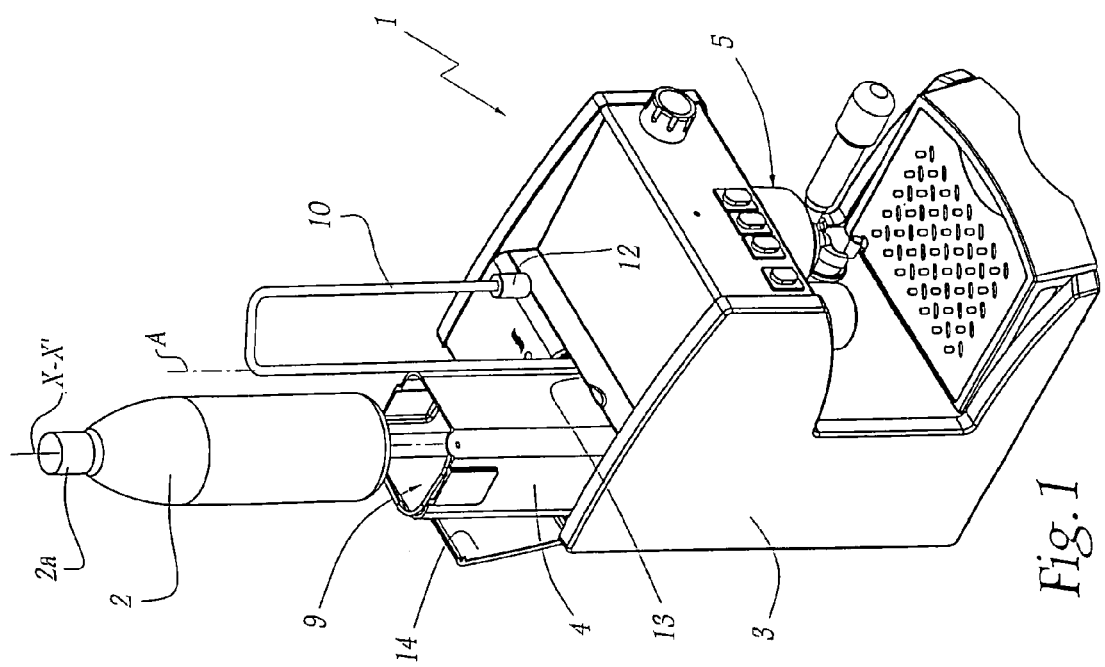
FIG. 1 is an exploded view, in perspective, of an assembly comprising a water storage bottle and an electric coffee maker according to the invention.

When the bottle 2 is empty, the electric coffee maker 1 can be refilled by replacing this empty bottle 2 with another one which is similar, but full. In order to withdraw the empty bottle 2, the flap 14 is firstly opened. Then the strainer 12 is extracted from the empty bottle 2, by sliding the rigid tube 10 upwardly, after which this rigid tube 10 is pivoted so as to clear the opening 13. Thereafter, the suction conduit 6 is as illustrated in FIGS. 1 and 2. The bottle 2 can then be slid out of the reservoir 4. A full bottle 2 is then installed by applying the procedure in reverse with respect to that which has just been described.

In accordance with the object of the invention, it follows from the foregoing that it is particularly simple to effect a refill of water by exchanging an empty bottle by a full one, particularly when the replacement bottle has not been filled by the user, but purchased already full.

It will be noted that, if the device 5 is supplied with water stored in bottles 2, there is no need to clean any water storage reservoir, such as reservoir 4, this being an advantage.

Furthermore, the protective housing 3 and the flap 4 protect the bottle 2 in the course of use against substances such as dust or coffee grounds, which might penetrate in this bottle 2 and pollute the water that it contains.

In addition, the fact that the bottle 2 being used occupies a determined place inside the protective housing 3, promotes correct connection of this bottle 2 to the device 5, without risk of draining the pump 7.

Furthermore, if the bottle 2 leaks, the water which escapes via this leak is recovered by the reservoir 4 and therefore does not risk creating damage.

The bottle 2 is advantageously purchased already full. It contains weakly mineralized mineral water which contains no or only very little chlorine or other substances altering the taste of the coffee and which is not or only weakly calcareous. A coffee prepared with such water presents improved qualities of taste. In effect, like the presence of chlorine, the presence of limestone in the water degrades the taste of the coffee, since it leads to the formation of fur which, in the long run, is detrimental to the performances of the coffee maker.

In FIG. 5, no bottle 2 is installed inside the reservoir 4, which, on the contrary, is filled with water 15 intended to be drawn via the conduit 6 before being used for preparing the coffee. The presence of the reservoir 4 therefore means that it is possible to use the coffee 1 in conventional manner.

What is claimed is:

1. An electric coffee maker, comprising a coffee preparing device for preparing a coffee drink from ground coffee and water, a protective housing which at least partially encloses the coffee preparing device, a reservoir defining an inner free volume in which a water storage bottle for preparing the coffee drink may be directly contained and being configured so as to accommodate a bottle having water stored therein that may be used for preparing the coffee drink, an opening in the protective housing providing access to said free volume, the electric coffee maker including a device for temporarily communicating the coffee preparing device to convey water from either an inner volume of the water storage bottle or the inner free volume of the reservoir, and the device for temporarily communicating including a suction conduit terminating by two ends of which one is connected to the coffee preparing device and the other end of the suction conduit being movable and adapted to be introduced in the water storage bottle disposed substantially vertically in the reservoir or in the inner free volume of the reservoir.

2. The coffee maker of claim 1, wherein said free volume is contained in an imaginary rectangular parallelepiped which has a length of 350 mm and a square cross section with sides measuring 120 mm.

3. The coffee maker of claim 1, wherein the free volume contains an imaginary cylinder of revolution having a length of about 170 mm and a diameter of about 70 mm.

4. The coffee maker of claim 1, wherein the free volume is elongated along a substantially vertical axis.

5. The coffee maker of claim 1, wherein the opening providing access to the reservoir is located above the reservoir, the protective housing including a movable flap for obturating this opening.

6. The coffee maker of claim 1, including a scale for weighing the water available for preparing coffee.

7. The coffee maker of claim 1, wherein a pump forms part of the coffee preparing device.

8. An electric coffee maker comprising, in combination, a water storage bottle and a coffee preparing device for preparing a coffee drink from ground coffee and water, a protective housing which at least partially encloses the coffee preparing device, a reservoir defining an inner free volume in which water for preparing the coffee drink may be directly contained and being configured so as to accommodate the water storage bottle having water stored therein that may be used for preparing the coffee drink, an opening in the protective housing providing access to said free volume, the electric coffee maker including a device for temporarily communicating the coffee preparing device to convey water from either an inner volume of the water storage bottle or the inner free volume of the reservoir, the device for temporarily communicating including a suction conduit terminating by two ends of which one is connected to the coffee preparing device and the other end of the suction conduit being movable and adapted to be introduced in a bottle disposed substantially vertically in the reservoir or in the inner free volume of the reservoir and wherein a neck of the water storage bottle is directed upwardly and is not hermetically obturated such that the suction conduit communicates within the water storage bottle by way of the neck.

9. A method of preparing a coffee drink using a coffee maker having a coffee preparing device to prepare the drink from water and ground coffee and wherein the coffee has a reservoir in which water may be introduced in liquid form as a supply to the coffee preparing device, the method comprising the step of:
   a. placing a bottle having water contained therein within the reservoir;
   b. thereafter inserting a communication conduit between an inner space of the bottle and the coffee preparing device; and
   c. thereafter mixing water from within the bottle with the ground coffee and preparing the coffee drink.

* * * * *